United States Patent [19]
Delmas

[11] Patent Number: 5,911,886
[45] Date of Patent: Jun. 15, 1999

[54] DEVICE FOR FILTRATION OF CRYOPRECIPITATE AND ITS APPLICATION

[75] Inventor: Olivier Marcel Joseph Delmas, Montbazon, France

[73] Assignee: Inoteb, Saint-Gonnery, France

[21] Appl. No.: 08/724,254

[22] PCT Filed: Mar. 31, 1995

[86] PCT No.: PCT/FR95/00418

§ 371 Date: Jan. 29, 1997

§ 102(e) Date: Jan. 29, 1997

[87] PCT Pub. No.: WO95/26800

PCT Pub. Date: Oct. 12, 1995

[30] Foreign Application Priority Data

Mar. 31, 1994 [FR] France ..................... 94 03828

[51] Int. Cl.⁶ .......................... B01D 37/00; B01D 39/00; B01D 35/00; A61M 1/34

[52] U.S. Cl. ............... 210/767; 210/433.1; 210/435; 210/445; 210/450; 210/645; 210/800; 604/408; 604/410

[58] Field of Search ................. 210/433.1, 645, 210/435, 445, 450, 453, 767, 800; 435/2; 604/408, 410

[56] References Cited

U.S. PATENT DOCUMENTS

| | | | |
|---|---|---|---|
| 2,765,923 | 10/1956 | Novak | 210/448 |
| 3,932,153 | 1/1976 | Byrns | 210/445 |
| 4,021,353 | 5/1977 | Raines et al. | 210/448 |
| 4,035,304 | 7/1977 | Watanabe | 210/445 |
| 4,265,762 | 5/1981 | Brenholt | 210/472 |
| 4,341,538 | 7/1982 | Vadnay et al. | 210/445 |
| 4,422,939 | 12/1983 | Sharp et al. | 210/445 |
| 4,906,260 | 3/1990 | Emheiser et al. | 210/445 |
| 5,269,924 | 12/1993 | Rochat | 210/445 |
| 5,543,062 | 8/1996 | Nishimura | 210/453 |
| 5,591,337 | 1/1997 | Lynn et al. | 210/496 |

FOREIGN PATENT DOCUMENTS 2 199 510  7/1988  United Kingdom .

*Primary Examiner*—John Kim
*Attorney, Agent, or Firm*—Nixon & Vanderhye

[57] ABSTRACT

The present invention provides a device with a filter bag for separating a liquid phase from a suspended solid phase in a biological fluid.

15 Claims, 4 Drawing Sheets

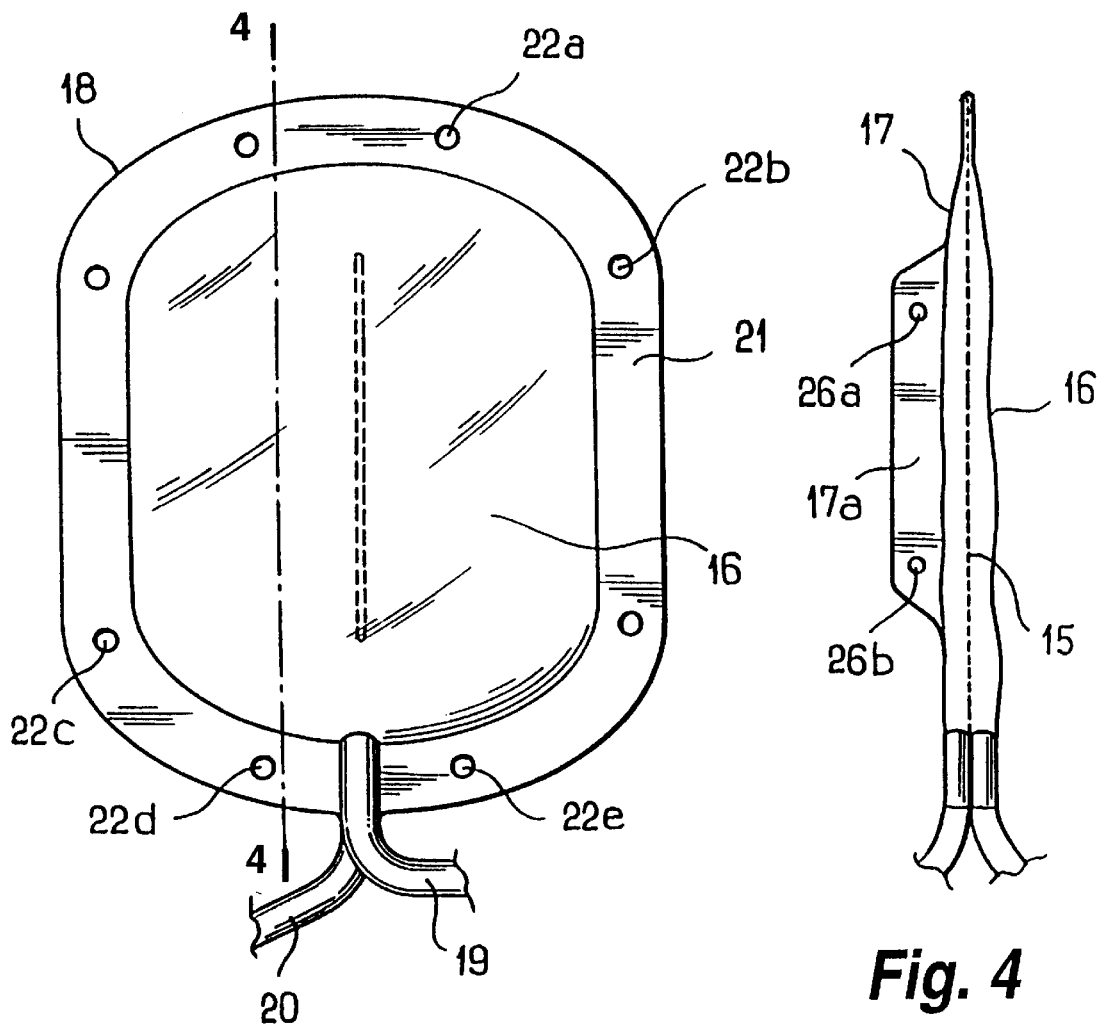

DEVICE FOR FILTRATION OF CRYOPRECIPITATE AND ITS APPLICATION

This application is a PCT/USA National Phase Application of PCT/FR95/00418 filed Mar. 31, 1995 which is based on French Application NO. 94 03828 filed Mar. 31, 1994, the entire contents of both applications being hereby incorporated by reference.

BACKGROUND OF THE INVENTION

The invention relates to a filter device, which is intended to separate a liquid phase from a solid phase in a biological fluid, and to its application.

This device can be used, for example, in the separation of a blood plasma cryoprecipitate. It is known that when frozen blood plasma is thawed to a temperature generally of between +1 and +4° C., not only is a liquid phase obtained, but also a residue which remains solid at this temperature and which is called cryoprecipitate. The cryoprecipitate includes substances which are of therapeutic interest, such as clotting factor VIII, or the proteins which can be coagulated by thrombin, and in particular fibrinogen, fibronectin and factor XIII. Factor VIII is used in the treatment of haemophilia type A. The proteins which can be coagulated by thrombin are used, in the form of the cryoprecipitate, in particular as a "biological adhesive"; see, for example, the patent FR 2 448 900. Biological adhesives are used in surgery on account of their haemostatic and adhesive properties. Their use makes it possible to avoid forming sutures or using synthetic adhesives which are potentially toxic.

The cryoprecipitate is usually obtained from one or more samples of whole blood. Blood is taken from a healthy donor, for example, or from a patient who is registered in an autotransfusion programme, with the aid of a blood collection system comprising a number of transfer bags which are connected to each other via tubing. The blood collection bag contains an anticoagulant. The plasma is separated by centrifuging and is discharged into one of the other bags. The plasma is then frozen, and subsequently thawed to a temperature which permits fusion of the plasma, but which is sufficiently low to prevent the cryoprecipitate from solubilizing. For the preparation of a cryoprecipitate, reference may be made, for example, to the article by Masure in Vox Sang. 16, 1–9 (1969).

Special techniques can be employed to prevent contamination of the product during the preparation. The preparation is preferably done in a closed circuit, the transfers of liquids being carried out in a series of bags and tubings which have previously been connected to one another and sterilized before use.

The separation of the liquid phase and the solid phase, that is to say the separation of the residual plasma and the cryoprecipitate, can be carried out either by centrifuging or by filtration.

Centrifuging has a number of drawbacks which are inherent to this method, that is to say, in addition to the requirement to have a centrifuge available, there is the difficulty of decanting the supernatant without disturbing the centrifugation concentrate, and the difficulty of recovering the centrifugation concentrate after decantation, since this concentrate occupies a small volume, while being contained in a vessel of large volume.

Filtration also involves technical difficulties. It is necessary, in the first instance, to prevent clogging of the filter. Porous filtering membranes can be used as filters, but in practice these necessitate the use of an auxiliary pump.

French Patent 2 283 700 has proposed using a thickness filter, consisting, for example, of fibrous materials forming an irregular, three-dimensional entanglement. However, with thickness filters, the difficulty lies in recovering the cryoprecipitate; in practice, it is necessary in this case to redissolve the cryoprecipitate in a suitable solvent.

SUMMARY OF THE INVENTION

With the object of remedying these various disadvantages of the prior art, the invention relates to a device with filter bag for separating a liquid phase from a solid phase in a biological fluid in which the said solid phase is in suspension, comprising:

a bag formed essentially by a first wall and by an opposite second wall which are each made of a flexible film and are impermeable to the fluids and are sealed in a leaktight manner in a sealing zone on their periphery, in such a why as to define an internal space between the two opposite walls, filtration means which are situated inside the said bag and are capable of holding back the said solid phase, in the form of a retentate, while permitting passage of a filtrate consisting of the said liquid phase, the said filtration means being formed by at least one sheet-shaped filtering element, of which at least one part of the surface is a filtering surface, the said sheet being disposed between the said first and second walls and separating two compartments within the said internal space, namely an upstream compartment and a downstream compartment, which are each defined by one of the faces of the said sheet and by the opposite inner face of one of the said walls, in such a way that a fluid present in one of the said compartments can gain access to the other compartment only by passing through the said filtering surface, means for admitting the said biological fluid from an external source towards the inside of the said bag, the said admission means opening out into the upstream compartment, and means for evacuating the said filtrate and the said retentate to the outside, the said evacuation means permitting evacuation of the filtrate from the downstream compartment to the outside and being situated in proximity to the periphery of the said filter bag, characterized in that the said filtering surface is a rigid surface or a surface which can be rendered rigid.

During use, it is expedient that the filtering surface be rigid or that it be rendered rigid, and in the case where the filtering surface is not rigid upon construction, the device of the invention additionally comprises means making it possible to rigidify the filtering surface.

The filtering element which is used in the filter bag of the invention is in a sheet form; this means, in particular, that it is not a thickness filter, in contrast to the filter in Patent FR 2 283 700. The filtering element according to the invention can be made in particular of a woven material in the manner of a bolting cloth or similar. The dimensions of the pores must permit the cryoprecipitate to be retained. Use is especially made of filters having pores which can have diameters of 10–75 micrometres; for example, pore diameters of the order of 25 micrometres permit a cryoprecipitate to be retained in a satisfactory manner while at the same time limiting the clogging of the filter. It is also possible to use two superposed filtering elements which, if appropriate, can have different pore diameters.

It is evident that the two walls of flexible film, as they are not sufficiently deformable elastically, are not stretched tightly along the filtering surface, in such a way as to be able to form a space permitting the biological fluid and the filtrate to be received in the upstream and downstream compartments, respectively, during filtration.

One of the principal characteristics of the filter bag of the invention is that the filtering surface must be rigid at least during use, and this can be achieved in two ways: either the filter bag includes a frame constituting a rigid peripheral zone, and the filtering surface occupying the central zone surrounded by the said frame is sufficiently tensioned during manufacture to acquire the desired rigidity; or else the filtering element is made entirely in the form of a flexible sheet and, in this case, it is expedient to use the filter bag by exerting a sufficient tension so that the filtering element then constitutes a rigid plane. The term "rigid" here signifies that when the filter bag is immobilized, the filtering surface remains substantially plane when a force of the order of that resulting from atmospheric pressure during filtration is applied to it in a direction perpendicular to the plane of the said filtering surface. Then, at the end of filtration, the flexible wall of the bag, on the retentate side, will, under the effect of the atmospheric pressure, press the retentate onto the filtering surface, which is virtually non-deformable on account of its being rigidified, and this will promote good drying of the cryoprecipitate.

According to one particular embodiment, the device of the invention is characterized in that it comprises a rigid frame corresponding to the said peripheral sealing zone. For example, the frame is in the form of a rigid plate including a central aperture, and one of the walls is sealed on one of the faces of the said plate, whereas the other wall is sealed on the other face of the plate. The filtering element is interposed between the two walls. It is of course in the zone corresponding to the central aperture that the filtration will take place, by the liquid phase passing through the filtering element from the upstream compartment towards the downstream compartment. With this embodiment, it is therefore possible to form a filter bag with two filtering elements which face each other and which are fixed, each one at its periphery, on one of the faces of the plate.

The frame, which is made, for example, of a plastic material having a thickness which is sufficient to confer upon it the desired rigidity, can be of any shape, for example rectangular, circular or oval.

An equivalent embodiment is characterized in that the filtering element is in the form of a flat sheet including a rigid peripheral zone which makes it possible to rigidify the filtering surface during the manufacture of the said filtering element, and in that the said first and second walls are sealed with the filtering element on the said rigid peripheral zone. This embodiment can be obtained, for example, by using a frame, such as the one defined hereinabove, in which the peripheral zone of the filtering element is embedded. Such an embodiment, which is illustrated in FIG. 2, can be obtained by injection-moulding the material of the frame in such a way as to embed, within the said material, the peripheral zone of the filtering element which is sufficiently tensioned so that the filtering element edged by the frame thus formed presents a flat filtering surface. A similar embodiment may conceivably be obtained by inserting the filtering element between two identical frames facing each other, the frames being as defined hereinabove, in such a way that the peripheral zone of the filtering element is trapped between the two opposite faces of the two frames, and the whole structure is then assembled by hot welding at a suitable pressure. A device is thus obtained in which the filtering element edged by the frame has a tensioned and rigid flat surface on construction.

According to another embodiment, the device of the invention is characterized in that the second wall and the filtering element are each made of a flexible material, not rigidified on construction, and in that the said device comprises means making it possible to rigidify the said filtering element by tensioning in one plane.

The term "flexible" material is understood here as meaning a material which, in sheet form, can be folded, for example, without any appreciable manual effort and without breaking.

The means for rigidifying the filtering element comprise all means which allow the filtering element to adopt a flat shape, thereby effecting a tensioning of the filtering element in its plane. These means for rigidifying the filtering element comprise at least means for fixing the vertically disposed filter bag, via its upper edge, to a suitable support, the tensioning of the filtering element in its plane being effected at least by the gravitational forces. In a more elaborate embodiment, the means for rigidifying the filtering element can comprise a rigid casing of substantially plane surface, to which the filter bag can be fixed temporarily, in a manner known per se, with the aid of movable fixing means, thereby effecting a tensioning of the filtering element in one or more directions of its plane.

So that the filtration can be carried out under good conditions of efficacy, it is particularly expedient that the downstream compartment have a volume which is not substantially zero, as has already been indicated hereinabove, in such a way as to be able to receive the filtrate before its onward evacuation to the outside. In other words, it is necessary to avoid the filtering surface being entirely in contact with the second wall, at least during the use of the filtering device. For this purpose, the second wall can be equipped with means permitting the said second wall to be distanced from the filtering surface; for example, the formation of a beaded edge at the level of the peripheral sealing zone can contribute to this distancing; it is also possible to equip the second wall with means allowing it to be stretched in such a way as to remove it from the filtering element.

The evacuation means are preferably situated in proximity to the periphery of the filter bag and can in particular be near the admission means, which are themselves preferably situated in proximity to the periphery.

The device of the invention can be produced in the form of multiple bags. In particular, it can additionally comprise a flexible bag intended to receive the biological fluid to be filtered, this supplementary flexible bag being connected, or being capable of being connected, to the admission means by way of tubing, for example a flexible tubing.

The device can also comprise another flexible bag which is intended to receive the filtrate and which is connected, or capable of being connected, to the filtrate evacuation means by way of tubing similar to the tubing previously mentioned.

The invention also relates to a method of using the device defined hereinabove. This method is principally characterized in that:

the said filter bag is disposed on a suitable support in such a way that the said filtering surface, which is rigid or in the rigidified state, is situated in a substantially vertical plane, the said filtrate evacuation means being situated in proximity to the lower part of the bag disposed in this way, the said admission means are connected to a flexible bag containing the said biological fluid in which the said solid phase is in suspension, the said flexible bag being disposed on a support at a position higher up than the filter bag, in such a way that the biological fluid which it contains can flow by gravity into the upstream compartment, the said evacuation means are brought into communication with the outside in order to permit evacuation of the filtrate by gravity, and the said solid phase retained is recovered from the upstream compartment.

According to one particular embodiment, the means for admitting the biological fluid are also situated in proximity to the lower part of the filter bag disposed as indicated hereinabove. Such an arrangement makes it possible to have, above the level of the liquid in the retentate compartment of the filter bag, an area of filtering surface which is not yet used and which is therefore definitely not clogged. Thus, the clogging of the filtering surface is only gradual. Of course, it is a simple matter to give the filtering surface predetermined dimensions which are adapted such that there always remains an area of the surface which is not clogged. These dimensions can be determined, by simple routine trials, as a function of the volume of fluid to be filtered.

BRIEF DESCRIPTION OF THE DRAWINGS

Specific and non-limiting embodiments will now be described with reference to the attached drawings, in which:

FIG. 3 is a front view of another embodiment of the filtering device, FIG. 4 is a cross-sectional view along EF in FIG. 3.

DETAILED DESCRIPTION OF THE INVENTION

Figures 1, 2:
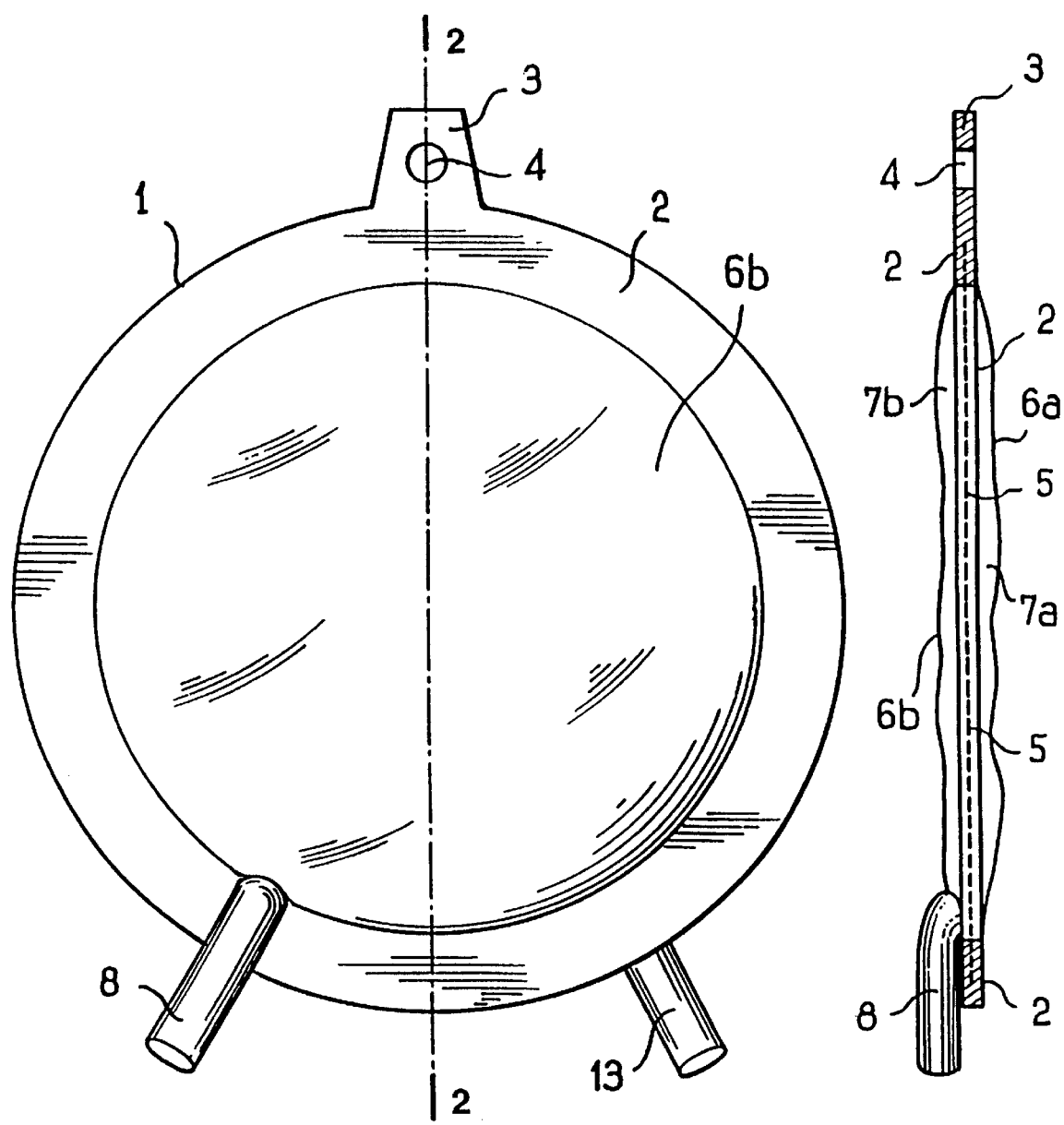
FIG. 1 is a front view of a specific embodiment of the filter bag of the invention.
FIG. 2 is a diagrammatic cross-sectional representation of the device along a—a in FIG. 1.
Figure 5:
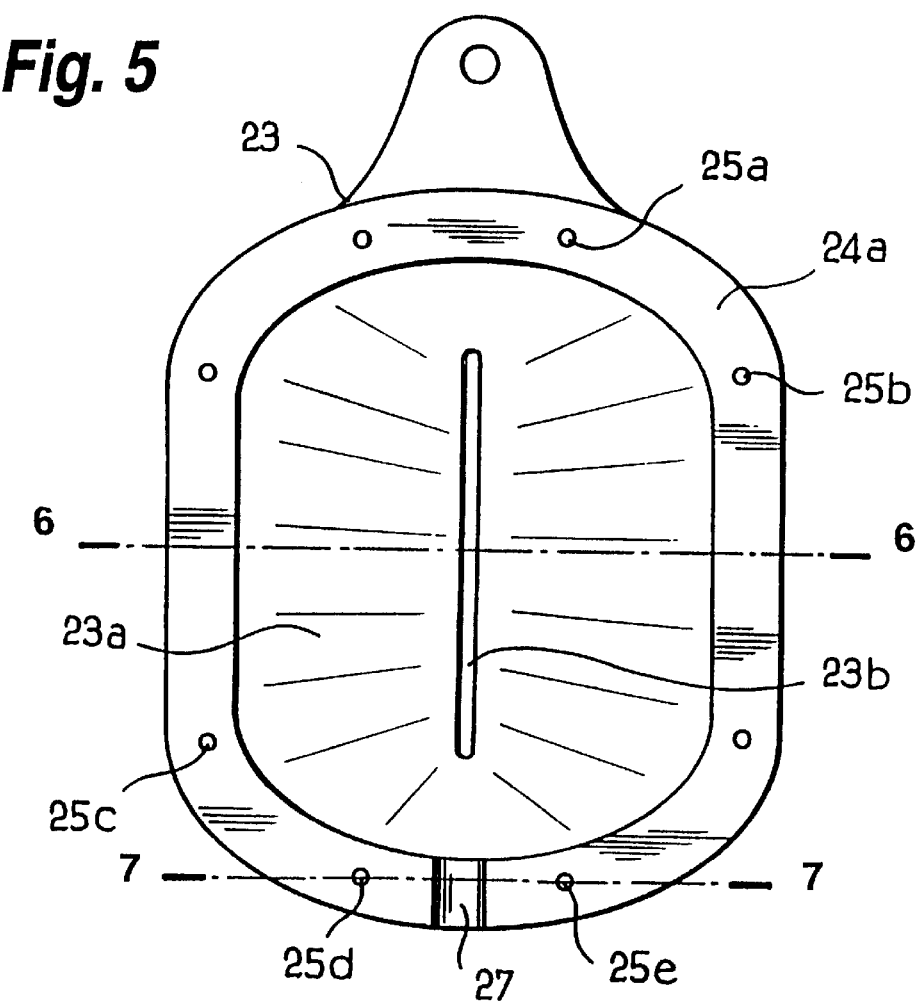
FIG. 5 is a front view of a casing used in combination with the filter bag in FIG. 3.
Figure 8:
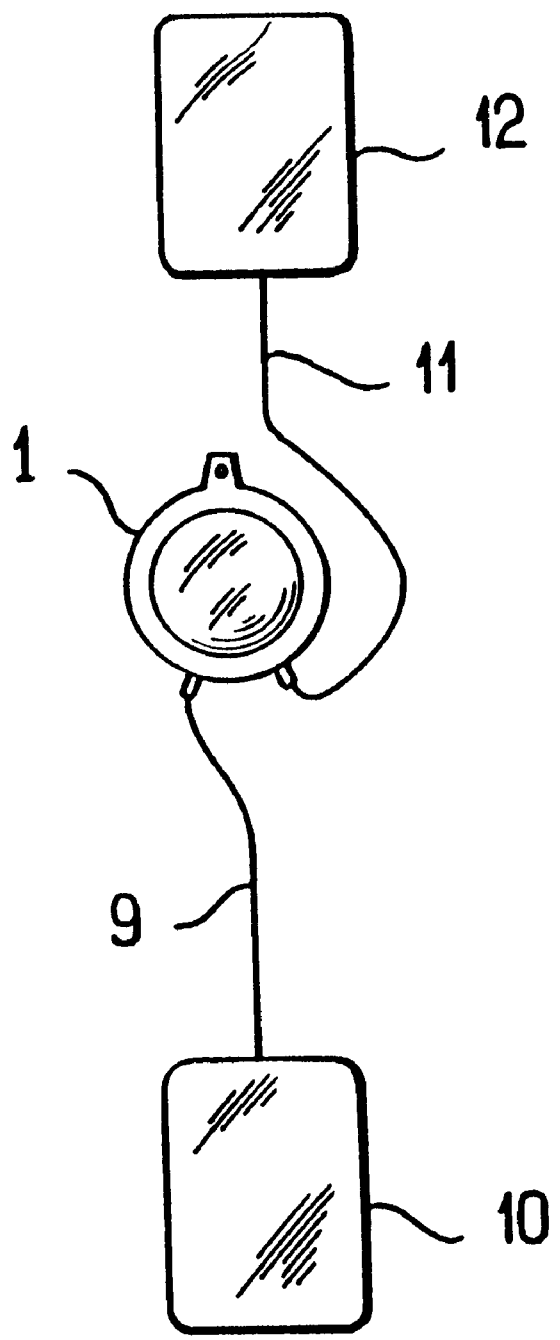
FIG. 8 is a diagrammatic representation of the device intended to implement the process of the invention.

Referring to FIGS. 1, 2 and 8, the filtering device 1 comprises a rigid frame 2 consisting of a plate which is here in the form of a circular collar equipped with a tongue 3 which is punctured with a hole 4 for attaching the device to a suitable support. The device comprises a filtering element 5 (represented by a dashed line in FIG. 2) whose peripheral zone is embedded on construction within the material constituting the frame 2.

The walls 6a and 6b define the upstream compartment 7a and the downstream compartment 7b, respectively. The downstream compartment is equipped on its periphery with an outlet orifice or nozzle 8, which can be connected to tubing 9 opening into the flexible bag 10 intended to receive the filtrate.

Admission tubing 11 connects the filtering device to the flexible bag 12 which contains the liquid to be filtered. The tubing 11 is connected to the inlet orifice (nozzle 13) which opens out at the periphery of the upstream compartment defined by the filtering element and the flexible wall 6a.

The frame 2 can be made of any conventional material rigid at ambient temperature, such as polyvinyl chloride, polypropylene or polycarbonate.

The filtering element 5 comprises, for example, a woven nylon cloth.

The flexible walls 6a and 6b are made, for example, in the form of a polyethylene or polyvinyl chloride (PVC) film.

The outer shape of the filtering device, in the plane of the filtering element, can be circular (as in FIG. 1, with, for example, an external diameter of 85 mm, the central aperture defined by the frame 2 having a diameter of 75 mm), oval or rectangular. The filtering element, of circular shape and having the dimensions of the external disc of the frame 2, is cut from a bolting cloth of woven nylon, with a pore diameter equal to about 25 micrometres. A rigidified filtering element is obtained by injection-moulding the material of the frame in such a way as to embed, within the said material, the peripheral zone of the filtering element. The frame 2 thus formed around the filtering element has a thickness of 4 mm. The walls 6a and 6b, of identical shape and dimensions, are cut from a PVC film having a thickness of 0.3 mm. The filtering element, equipped with its frame, and the walls are juxtaposed (as shown in. FIG. 2) and joined together by hot welding around the whole of their peripheral zone, except for the location of the nozzles 8 and 13. The nozzle 8, inserted between the PVC film 6b and the frame, is welded to these. The whole structure thus obtained is glued or welded. The same operation is performed with the nozzle 13 and the film 6a.

In an operation for filtration of a cryoprecipitate, approximately 400 ml of blood were collected in a conventional flexible bag system with multiple bags (Maco-Pharma, Tourcoing, France), comprising three bags. By centrifuging at 2500 rpm at 18° C. for 20 minutes, the blood plasma is separated and is transferred in a manner known per se into one of the bags of the multiple bag system. The bag in which the erythrocytes have been collected is separated. A system is then obtained comprising two bags connected via tubing, one of the bags 12 containing the plasma, and the other being empty. The tubing 11 between the two bags is closed, for example by clamping. The two-bag assembly is placed in a freezer chamber, at a temperature of −20° C., for 24 hours. The plasma is then thawed to a temperature of +3° C. for 72 hours. The presence of a cryoprecipitate in suspension in the liquid plasma is observed. The bag 12 containing the plasma and the cryoprecipitate is connected with 11 the filtering device 1, it being possible for the connection to be made with the aid of tubing which is equipped with a trocar intended to be inserted in the bag 12. The connection can also be made with the aid of a sterile connection apparatus, such as type SCD 2B (trademark) marketed by Terumo. The flexible bag 12 is disposed, with the aid of a support (not shown), in a position situated above that occupied by the filtration device 1, itself fixed on a suitable support, while the bag 10, intended to receive the filtrate, is disposed below the level of the filtering device 1. The overall system is maintained at a temperature of the order of 4° C. The tubing 11 which had been closed off by clamping is freed. The liquid contained in the bag 12 flows by gravity and runs into the upstream compartment of the filtering device 1. After passing through the filter, the filtrate arrives in the downstream compartment of the filtering device 1 and flows by gravity into the bag 10 via the tubing 9. If need be, the filtration can be started by exerting pressure on the bag 12, for example manually. The rate of flow can be regulated, for example by partial clamping of the tubing 11. At the end of filtration, it is noted that the flexible walls bear against the filtering surface, which fact facilitates effective drying of the cryoprecipitate which is retained in the upstream compartment.

At this stage, it is possible to separate the filtering device 1 from the bags 10 and 12, for example by welding and then cutting the tubings 9 and 11 in proximity to their point of connection to the device 1. The filtering device 1 containing the cryoprecipitate can, if so desired, be kept in a freezer chamber, pending its use. At the time of use, the cryoprecipitate can be recovered, for example by immersing the filtering device in a water bath at 37° C. for approximately 10 minutes. The cryoprecipitate is then in liquid form and can be recovered, for example, with the aid of a syringe connected to the intended site of removal which can lead both into the upstream compartment and also into the downstream compartment: this can be, for example, the orifice 8 or 13. The cryoprecipitate suctioned into the syringe can then be used, for example, as a biological adhesive. In this case it can be mixed, directly on the operating site to be treated, with a solution of thrombin in the presence of calcium ions.

When 450 ml of thawed plasma were filtered using this equipment, it was possible to recover 4 g of cryoprecipitate. The filtration lasted approximately three hours.

Alternatively, it is possible to carry out the filtration while the plasma is not yet fully thawed, the filtration taking place in step with the thawing. During the filtration, the whole system must of course be maintained at a temperature at which the cryoprecipitate does not liquefy.

The tubings 9 and 11 have a diameter of 2.7 mm.

Referring to FIGS. 3 to 7, a description will now be given of a second embodiment in which the filtering device is formed by juxtaposition of materials in the form of flexible sheets. The filtering device 18 is formed by the juxtaposition of the flexible sheets 16, 15 and 17, followed by their being welded along the periphery, except in the zones where the inlet orifice 19 and outlet orifice 20 open out. The peripheral welding zone 21 is equipped with perforations 22a, 22b, 22c, 22d, 22e, etc. In this second embodiment, the filtering element can again be a woven cloth, for example a nylon cloth 15, and the two walls, upstream 16 and downstream 17, are both made of a flexible film, for example of PVC.

This flexible filtering device can be used, for example, with a rigid casing which allows the filtering element to be rigidified in one plane. It is possible to use, for example, the casing 23 represented in FIG. 5, which casing can be made of metal or of rigid plastic material, for example a transparent plastic material such as polycarbonate, polypropylene or polyethylene.

Figure 6:
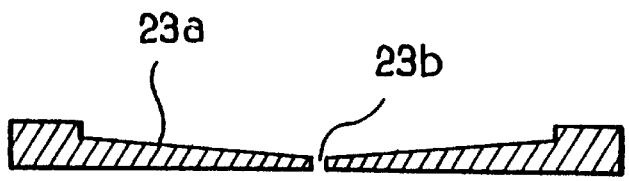
FIG. 6 is a cross-sectional view along AB in FIG. 5.
Figure 7:
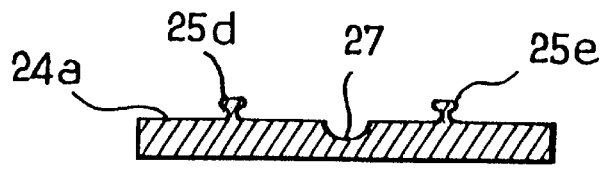
FIG. 7 is a cross-sectional view along CD in FIG. 5.

This casing 23, whose inner face 23a is intended to lie facing the downstream wall 17 of the filtering device, includes a peripheral part 24 whose inner face 24a is equipped with studs 25a, 25b, 25c, 25d, 25e, etc., which are disposed in such a way as to correspond to the perforations 22a, 22b, 22c, 22d, 22e, etc., respectively, of the peripheral zone of the filtering device. Thus, by engaging the said perforations in the corresponding studs, it is possible to stretch the filtering element 15 in one plane (corresponding substantially to the plane of the drawing in FIG. 5). Furthermore, as can be seen in FIG. 6, the inner face 23a of the casing is slightly oblique in relation to the main plane of the casing, from the periphery towards the central zone, and defines a hollow part by means of which it is possible to prevent the wall 17 from being in contact with the filtering element 15. For this purpose, the wall 17 can be equipped, for example, with a tongue 17a which will be disposed in such a way as to pass through the axial slot 23b provided on the casing. The wall 17 can be stretched, for example, with the aid of the tongue 17a and it can be maintained in a position corresponding to a stretching of the wall 17 by suitable means. The wall 17 is thus distanced from the filtering element 15.

The tongue 17a, for example made of a flexible plastic sheet, can be welded in particular along the vertical axis of symmetry of the wall 17. That part of the tongue situated outside after passing through the slot 23b can be equipped, for example, with perforations 26a and 26b which are intended for attaching tensioning devices on suitable studs (not shown) provided on the outer face of the casing. The base of the casing has a groove 27 forming a seat for the end of the downstream tubing 20.

The dimensions of the device are the following, for example:

Filter bags and casings: width 85 mm, length 100 mm.
Width of welding zone: 10 mm.
This results in a filtering surface slightly greater than 45 cm².
Upstream tubing: length 1 meter; internal diameter 2.7 mm, identical to that of the usual tubings in blood collection systems, in order to permit the design for sterile connection to the conventional bags for blood and plasma recovery. It has at its lower end a cross-section with an internal diameter of 3.2 mm.
Downstream tubing: length 2 meters; internal diameter 3.2 mm. This downstream tubing is connected at its end to a 400 ml transfer bag (not shown).

Finally, it should be noted that it is possible to introduce, into the retentate compartment, an agent promoting the activation of clotting factor XII, such as, for example, powder kaolin. The cryoprecipitate obtained is then pre-activated by contact with the kaolin and can be stored in this state after separation of the kaolin. At the time of use, it will then suffice to add a solution containing calcium ions in order to trigger coagulation, for intended use as a biological adhesive.

I claim:

1. Process for preparing a cryoprecipitate adhesive material from a suspension of the cryoprecipitate in a biological fluid, with the aid of a device comprising:

a filter bag formed essentially by a first wall and by an opposite second wall which are each made of a flexible film and are impermeable to fluids and are sealed in a leaktight manner in a sealing zone on their periphery, in such a way as to define an internal space between the two opposite walls, filtration means which are situated inside the said filter bag and are capable of holding back a solid phase in said fluid, in the form of a retentate, while permitting passage of a filtrate consisting of a liquid phase of said fluid, the said filtration means being formed by at least one sheet-shaped filtering element, other than a thickness filter, of which at least one part of the surface is a filtering surface, the sheet being disposed between the first and second walls and separating said internal space into an upstream compartment and a downstream compartment, which are each defined by one of the faces of the sheet and by the opposite inner face of one of the walls, in such a way that a fluid present in one compartment can gain access to the other compartment only by passing through the filtering surface, admission means allowing entry of the biological fluid from an external source towards the inside of the filter bag, the admission means opening out into the upstream compartment, and evacuation means permitting evacuation of the filtrate from the downstream compartment to the outside and being situated in proximity to the periphery of the filter bag, the filtering surface being a rigid surface, or a surface which can be rendered rigid, and the device additionally comprising, in the latter case, means for making the filtering surface rigid; and said process comprising:
   disposing the filter bag on a support such that the filtering surface is situated in a vertical plane and the evacuation means is situated in proximity to a lower part of the filter bag,
   connecting the admission means to a flexible bag containing said suspension of the cryoprecipitate in the biological fluid, the flexible bag being disposed on a support at a higher elevation than the filter bag in such a way that the biological fluid which it contains flows by gravity into the upstream compartment,
   bringing the evacuation means into communication with the outside in order to permit evacuation of the filtrate by gravity, whereby said cryoprecipitate is obtained in the form of a solid phase retained in the upstream compartment.

2. The process according to claim 1, further comprising recovering said cryoprecipitate from the upstream compartment.

3. The process according to claim 2, wherein said recovering comprises heating said filter bag to liquify said cryoprecipitate and said process further comprises recovering said liquified cryoprecipitate.

4. The process according to claim 1, wherein said device comprises a filtering element in the form of a flat sheet which includes a rigid peripheral zone, and the said first and second walls are sealed on the rigid peripheral zone.

5. The process according to claim 1, wherein the second wall and the filtering element are each made of a flexible material, and the device further comprises rigidifying means which provide tensioning of the filtering element in one plane.

6. The process according to claim 5, wherein said rigidifying means comprises a rigid casing to which the filter bag can be fixed temporarily, thereby effecting a tensioning of the filtering element in its plane.

7. The process according to claim 5, wherein said device additionally comprises distancing means which permit the second wall to be distanced from the filtering surface.

8. The process according to claim 1, wherein said evacuation means are situated in proximity to the periphery of the filter bag and are near the admission means.

9. The process according to claim 1, wherein said device additionally comprises a flexible bag to receive the said biological fluid to be filtered, the said flexible bag being connected to the said admission means by way of tubing.

10. The process according to claim 1, wherein said device additionally comprises a flexible bag to receive the filtrate said flexible bag being connected to the said evacuation means by way of tubing.

11. The process according to claim 1, wherein said admission means is situated in proximity to a lower part of the said filter bag.

12. A device for preparing a cryoprecipitate adhesive material from a suspension of cryoprecipitate in a biological fluid, said device comprising:
   a filter bag formed essentially by a first wall and by an opposite second wall which are each made of a flexible film and are impermeable to fluids and are sealed in a leaktight manner in a sealing zone on their periphery, in such a way as to define an internal space between the two opposite walls,
   filtration means which are situated inside the said bag and are capable of holding back a solid phase in said fluid, in the form of a retentate, while permitting passage of a filtrate consisting of a liquid phase of said fluid, the said filtration means being formed by at least one sheet-shaped filtering element, other than a thickness filter, of which at least one part of the surface is a filtering surface, the sheet being disposed between the first and second walls and separating the internal space into an upstream compartment and a downstream compartment, which are each defined by one of the faces of the sheet and by the opposite inner face of one of the walls, in such a way that a fluid present in one compartment can gain access to the other compartment only by passing through the filtering surface, said filtering element being made of a flexible material,
   admission means allowing entry of the biological fluid from an external source towards the inside of the filter bag, the admission means opening out into the upstream compartment, and
   evacuation means permitting evacuation of the filtrate from the downstream compartment to the outside and being situated in proximity to the periphery of the filter bag, and
   rigidifying means which provide tensioning of the filtering element in one plane and comprises a rigid casing to which the filter bag can be fixed temporarily.

13. A device of claim 12, further comprising a flexible bag to receive said biological fluid to be filtered, said flexible bag being connected to said admission means by way of tubing.

14. A device of claim 12, further comprising a flexible bag to receive the filtrate said flexible bag being connected to said evacuation means by way of tubing.

15. A device of claim 12, wherein said admission means is situated in proximity to the lower part of said bag.

* * * * *